United States Patent
Dinn

(10) Patent No.: US 9,729,701 B2
(45) Date of Patent: *Aug. 8, 2017

(54) DEVICE INTERFACE

(75) Inventor: Kevin W. Dinn, Mount Kuring-Gai (AU)

(73) Assignee: Kannuu Pty Ltd., Mount Kuring-Gai, New South Wales (AU)

( * ) Notice: Subject to any disclaimer, the term of this patent is extended or adjusted under 35 U.S.C. 154(b) by 497 days.

This patent is subject to a terminal disclaimer.

(21) Appl. No.: 13/081,990

(22) Filed: Apr. 7, 2011

(65) Prior Publication Data

US 2011/0183720 A1    Jul. 28, 2011

Related U.S. Application Data

(63) Continuation of application No. 11/716,667, filed on Mar. 12, 2007, now abandoned, which is a
(Continued)

(30) Foreign Application Priority Data

Mar. 13, 2002 (AU) ..................... PS 1072

(51) Int. Cl.
*G06F 3/048* (2013.01)
*H04M 1/725* (2006.01)
(Continued)

(52) U.S. Cl.
CPC ........ *H04M 1/7258* (2013.01); *G06F 1/1626* (2013.01); *G06F 1/1662* (2013.01); *G06F 3/0237* (2013.01); *G06F 3/0238* (2013.01); *G06F 3/0481* (2013.01); *G06F 3/0482* (2013.01); *H04M 1/236* (2013.01); *H04M 1/27455* (2013.01); *H04M 1/72547* (2013.01); *H04M 1/72561* (2013.01)

(58) Field of Classification Search
CPC .... G06F 3/0237; G06F 17/243; G06F 17/276; G06F 17/2765; G06F 3/0236; G06F 9/4446; H04M 1/27558; H04M 1/72552; H04M 1/7258
USPC ................. 715/780, 812, 863, 816
See application file for complete search history.

(56) References Cited

U.S. PATENT DOCUMENTS 3,937,939 A    2/1976 Frenkel
5,128,672 A    7/1992 Kaehler
(Continued)

FOREIGN PATENT DOCUMENTS

CN    1199302    11/1998
DE    3123596    6/1981
(Continued)

OTHER PUBLICATIONS

International Search Report dated Apr. 8, 2008 from International Application No. PCT/AU2008/000297.
(Continued)

*Primary Examiner* — Joy M Weber
(74) *Attorney, Agent, or Firm* — Jones Day

(57) ABSTRACT

The present invention relates to a small computing device with an improved interface. The interface comprises a display screen which extends the majority of length of the face of the housing, and a plurality of multi-function buttons extending on either side of the display screen.

20 Claims, 13 Drawing Sheets

Related U.S. Application Data continuation of application No. 10/495,585, filed as application No. PCT/AU02/01114 on Aug. 20, 2002, now abandoned.

(51) Int. Cl.

| | | |
|---|---|---|
| *G06F 3/0481* | (2013.01) | |
| *G06F 1/16* | (2006.01) | |
| *G06F 3/023* | (2006.01) | |
| *G06F 3/0482* | (2013.01) | |
| *H04M 1/23* | (2006.01) | |
| *H04M 1/2745* | (2006.01) | |

(56) References Cited

U.S. PATENT DOCUMENTS

| | | | |
|---|---|---|---|
| 5,263,174 A | 11/1993 | Layman | |
| 5,299,125 A | 3/1994 | Baker et al. | |
| 5,398,023 A | 3/1995 | Murray | |
| 5,496,992 A | 3/1996 | Madan et al. | |
| 5,633,912 A | 5/1997 | Tsoi | |
| 5,724,069 A | 3/1998 | Chen | |
| 5,754,655 A | 5/1998 | Hughes et al. | |
| 5,787,417 A | 7/1998 | Hargrove | |
| 5,797,098 A | 8/1998 | Schroeder et al. | |
| 5,818,437 A * | 10/1998 | Grover et al. | 715/811 |
| 5,867,799 A | 2/1999 | Lang et al. | |
| 5,894,276 A | 4/1999 | Altidor et al. | |
| 5,896,321 A | 4/1999 | Miller et al. | |
| 5,901,222 A | 5/1999 | Macor | |
| 5,911,485 A | 6/1999 | Rossmann | |
| 5,953,541 A | 9/1999 | King et al. | |
| 5,983,214 A | 11/1999 | Lang et al. | |
| 6,002,390 A * | 12/1999 | Masui | G06F 3/04886 340/4.1 |
| 6,009,444 A | 12/1999 | Chen | |
| 6,011,554 A | 1/2000 | King et al. | |
| 6,032,053 A | 2/2000 | Schroeder et al. | |
| 6,047,196 A | 4/2000 | Makela et al. | |
| 6,055,439 A | 4/2000 | Helin et al. | |
| 6,150,962 A | 11/2000 | Rossmann | |
| 6,223,059 B1 | 4/2001 | Haestrup | |
| 6,247,043 B1 | 6/2001 | Bates et al. | |
| 6,264,146 B1 | 7/2001 | Hill et al. | |
| 6,311,125 B1 | 10/2001 | Okano et al. | |
| 6,377,965 B1 | 4/2002 | Hachamovitch et al. | |
| 6,580,932 B1 | 6/2003 | Finke-Anlauff | |
| 6,744,423 B2 | 6/2004 | Kraft et al. | |
| 6,748,242 B1 | 6/2004 | Dunleavy | |
| 6,792,287 B1 | 9/2004 | Tuomela et al. | |
| 6,801,659 B1 * | 10/2004 | O'Dell | G06F 3/0237 382/185 |
| 6,826,566 B2 | 11/2004 | Lewak et al. | |
| 7,185,286 B2 | 2/2007 | Zondervan et al. | |
| 7,443,316 B2 | 10/2008 | Lim | |
| 7,487,147 B2 | 2/2009 | Bates et al. | |
| 7,543,244 B2 | 6/2009 | Matthews et al. | |
| 7,616,191 B2 | 11/2009 | Matta | |
| 7,669,111 B1 | 2/2010 | Krause et al. | |
| 7,793,228 B2 | 9/2010 | Mansfield et al. | |
| 7,836,044 B2 | 11/2010 | Kamvar et al. | |
| 7,886,233 B2 | 2/2011 | Rainisto et al. | |
| 2001/0012769 A1 | 8/2001 | Sirola et al. | |
| 2001/0018351 A1 | 8/2001 | Hino et al. | |
| 2002/0049795 A1 | 4/2002 | Freeman | |
| 2002/0061770 A1 | 5/2002 | Ozaki | |
| 2002/0091690 A1 | 7/2002 | Bailey et al. | |
| 2002/0151327 A1 | 10/2002 | Levitt | |
| 2002/0183099 A1 | 12/2002 | Lee | |
| 2003/0073414 A1 | 4/2003 | Capp | |
| 2003/0078069 A1 | 4/2003 | Lindeman | |
| 2003/0182274 A1 | 9/2003 | Oh | |
| 2004/0105714 A1 | 6/2004 | Eo et al. | |
| 2004/0163032 A1 | 8/2004 | Guo et al. | |
| 2004/0192276 A1 | 9/2004 | Wesby et al. | |
| 2005/0010605 A1 | 1/2005 | Conrad et al. | |
| 2005/0188330 A1 | 8/2005 | Griffin | |
| 2005/0233769 A1 | 10/2005 | Tanaka et al. | |
| 2006/0009861 A1 | 1/2006 | Bonasia et al. | |
| 2006/0031591 A1 | 2/2006 | Hollstrom et al. | |
| 2006/0146028 A1 | 7/2006 | Chang et al. | |
| 2006/0217953 A1 | 9/2006 | Parikh | |
| 2006/0221058 A1 | 10/2006 | Fux et al. | |
| 2006/0265648 A1 | 11/2006 | Rainisto | |
| 2006/0265668 A1 | 11/2006 | Rainisto | |
| 2006/0294462 A1 | 12/2006 | Blair et al. | |
| 2007/0016862 A1 | 1/2007 | Kuzmin | |
| 2007/0060114 A1 | 3/2007 | Ramer et al. | |
| 2007/0089070 A1 | 4/2007 | Jaczyk | |
| 2007/0179776 A1 | 8/2007 | Segond et al. | |
| 2009/0327888 A1 | 12/2009 | Woolf et al. | |
| 2010/0010963 A1 | 1/2010 | Dinn | |

FOREIGN PATENT DOCUMENTS

| | | |
|---|---|---|
| DE | 10019727 | 10/2001 |
| EP | 624965 | 11/1994 |
| EP | 0789224 A2 | 8/1997 |
| EP | 1022644 | 7/2000 |
| FR | 2571442 | 1/1998 |
| GB | 2317531 | 3/1998 |
| GB | 2357220 A | 6/2001 |
| GB | 2363290 | 12/2001 |
| JP | 09-083402 | 7/1995 |
| JP | 407240776 A | 9/1995 |
| JP | 10293640 A | 11/1998 |
| JP | 2000267787 A | 9/2000 |
| JP | 2002149345 | 5/2002 |
| JP | 2005-159250 | 7/2005 |
| NL | 1011027 | 9/2000 |
| WO | 00/49731 | 8/2000 |
| WO | 00/59181 | 10/2000 |
| WO | 01/05047 | 1/2001 |
| WO | 01/67725 | 9/2001 |
| WO | 02/08876 | 1/2002 |
| WO | 02/13001 | 2/2002 |
| WO | 02/39244 | 5/2002 |
| WO | WO 02/069240 | 9/2002 |
| WO | 02/093338 | 11/2002 |
| WO | 03021418 | 3/2003 |
| WO | 03/077102 | 9/2003 |
| WO | 2004/017188 | 2/2004 |
| WO | 2005/064445 | 7/2005 |
| WO | 2006/100505 | 9/2006 |
| WO | 2007/019610 | 2/2007 |
| WO | 2008/080192 | 7/2008 |
| WO | 2008/106729 | 9/2008 |

OTHER PUBLICATIONS

International Search Report dated Feb. 6, 2008 from International Application No. PCT/AU2007/002010.
International Search Report dated Oct. 25, 2002 from International Application No. PCT/AU2002/001154.
International Search Report dated Aug. 29, 2006 from International Application No. PCT/AU2006/001151.
International Search Report dated Oct. 16, 2002 from International Application No. PCT/AU2002/01114.
"It's a Nokia . . . Game Boy Advance?", Jorgen Sundgot, InfoSyncWorld, Oct. 11, 2001 <http://www.infosyncworld.com/news/n/986.html>.
"iTAP" Predictive Text Input Technology Technical Paper Lexicus, A Division of Motorola, Version 1.0, Jun. 26, 2002, pp. 1-11. Retreived from the Internet on Aug. 28, 2006 at URL: http://www.toptrend.com.tw/library/product%20line/Lexicus/iTAP/iTAP%20Technical%20Paper%20for%20ESC.pdf.
"New Nokia 5510 is Entertainment Phone", Ana Leticia Sigvartsen, InfoSatellite.com, Oct. 11, 2001, <http://www.infosatellite.com/news/2001/10/a111001nokia_5510.htm>.
"Nokia 5510 User's Guide", Copyright 2001-2002, Selected Pages. Available at: <http://nds1.nokia.com/phones/files/guides/5510_usersguide_en.pdf>.

(56) References Cited

OTHER PUBLICATIONS

<www.francemobiles.com/telmob/pack/itineris/pa086271.php?from=aol>.
Examination Report dated Apr. 11, 2008 from Australian Application No. 2002331407.
First Office Action dated Mar. 10, 2006 for Chinese Patent Application No. 02825059.1.
Supplemental Search Report dated Dec. 1, 2006 for European Patent Application No. 02766922.5.
Examination Report dated Nov. 15, 2010 for European Patent Application No. 02766922.5.
Examination Report dated Feb. 17, 2010 for European Patent Application No. 02766922.5.
Examination Report dated Oct. 17, 2007 for European Patent Application No. 02766922.5.
Examination Report dated May 22, 2007 for European Patent Application No. 02766922.5.
Office Action dated Sep. 27, 2011 for Japanese Application No. 2008-525341 with English Translation.
Supplemental Search Report dated Feb. 19, 2007 for European Patent Application No. 02766922.5.
Supplemental Search Report dated Mar. 2, 2011 for European Patent Application No. 08714345.
First Office Action dated Feb. 12, 2010 for Chinese Patent Application No. 200710153468.4.
Examination Report dated Jun. 22, 2011 for Australian Patent Application No. 2010200095.
Examination Report dated Sep. 29, 2009 for New Zealand Patent Application No. 566172.
Examination Report dated Apr. 12, 2011 for New Zealand Patent Application No. 566172.
First Office Action dated Jun. 26, 2009 for Chinese Patent Application No. 2006800364961.
Examination Report dated Feb. 10, 2010 for Singapore Patent Application No. 200801128-0.
Examination Report dated Oct. 29, 2010 for Australian Patent Application No. 2006281970.

"Optimizing predictive text entry for short message service on mobile phones" by How et al. School of Computing, National University of Singapore, 2005. Retrieved from the Internet: http://en.scientificcommons.org/43594032.
Various Website Screenshots for WayBackMachine for n-e-ware.com and related websites; Various Dates.
KeyStick Text Entry System for Series 60 Mobile Phones Version 2.8.0; 2003.
"An Efficient Text Input Method for Pen-based Computers" by Toshiyuki Masui, Sony Computer Science Laboratory Inc., Shinagawa, Tokyo, Japan. In: Proceedings of the ACM Conference on Human Factors in Computing Systems (CHI'98), Apr. 1998. Retrieved from the Internet: http://www.pitecan.com/papers/CHI98/CHI98.pdf.
"The Use of Syntax in Word Completion Utilities" by Afsaneh Fazly, Graduate Department of Computer Science, University of Toronto, 2002, Retrieved from the Internet: http://www.cs.toronto.edu/pub/gh/Fazly-thesis.pdf.
International Search Report dated Jan. 15, 2002 from International Patent Application No. PCT/AU2002/001467.
European Search Report dated Dec. 1, 2006 for PCT/AU02/01114.
Ali K., Van Stam, W. TiVo: Making Show Recommendations using a Disturbed Collaborative Filtering Architecture, pp. 394-401. KDD 2004, Seattle, WA, 2004.
Gargi et al, "QuickSuggest: Character Prediction on Web Appliances", Google, Inc., 2010.
Bellman et al, "A Probabilistic Character Layout Strategy for Mobile Text Entry", 1998.
Ingmarsson et al, "TNT—A Numeric Keypad Based on Text Input Method", vol. 6, No. 1, pp. 639-646, 2004.
Isokoski, "Performance of Menu-Augmented Soft Keyboards", 2004.
MacKenzie, "KSPC (Keystrokes per Character) as a Characteristic of Text Entry Techniques", 2002.
Ward, et al, "Dasher—A Data Entry Interface Using Contiguous Gestures and Language Models".
Moffat, "Implementing the PPM data compression scheme", IEEE, 1990.

* cited by examiner

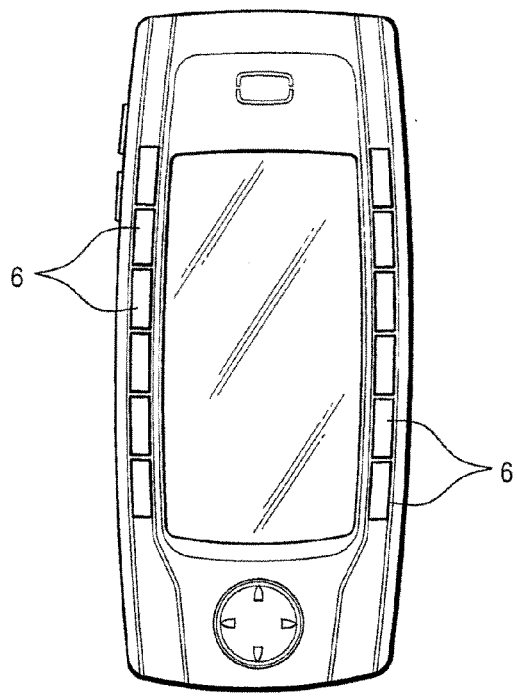
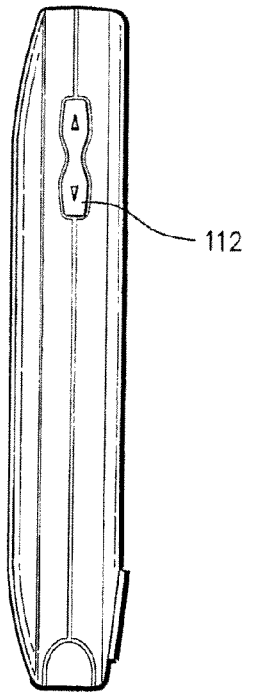
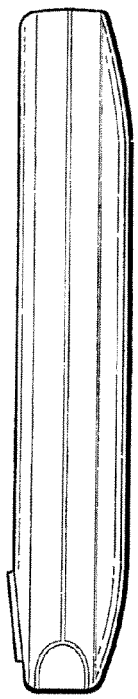
*Fig. 20a*   *Fig. 20b*   *Fig. 20c*
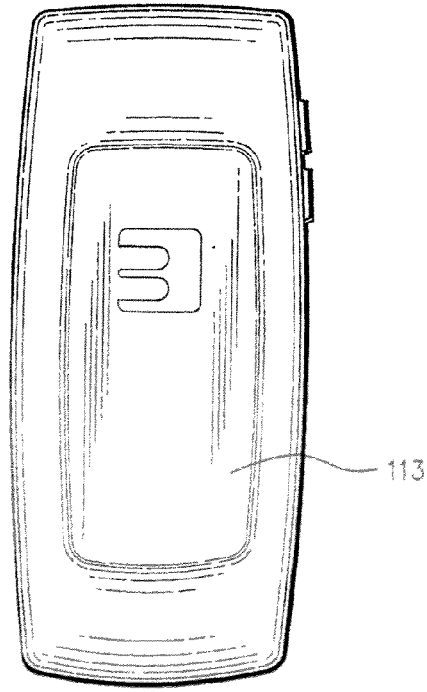
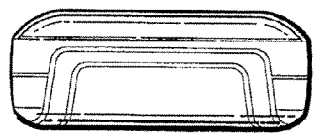
*Fig. 20e*
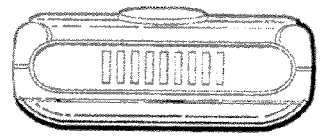
*Fig. 20f*
*Fig. 20d*

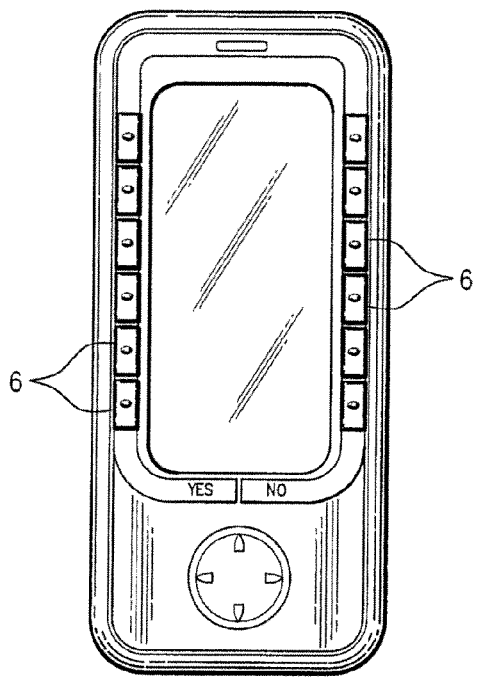
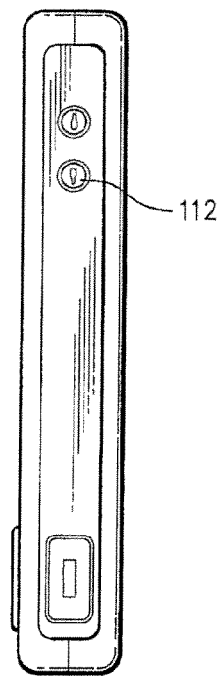
*Fig. 21a*   *Fig. 21b*   *Fig. 21c*
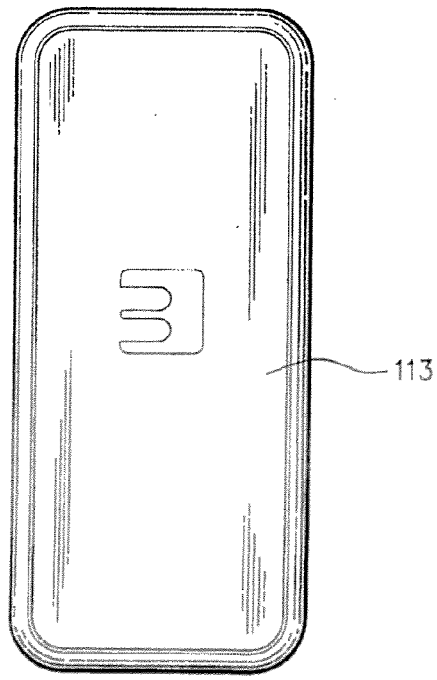
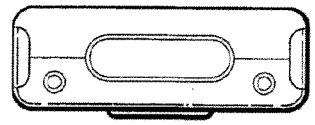
*Fig. 21e*
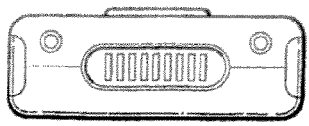
*Fig. 21f*
*Fig. 21d*

| IN-MEMORY TREE STRUCTURE | SECTION OF DATA FILE | |
|---|---|---|
| (tree diagram for words starting with l: lead, leader, leaders, leadership, leading, league, learn, learning, least, leave, leaving, led, lee, leeds, left, leg, legal, legislation, legs, length, less, let, letter, letters, level, levels, lewis) | labour ... lay | |
| | lead | 11721 |
| | leader | 8669 |
| | leaders | 7234 |
| | leadership | 4686 |
| | leading | 9619 |
| | league | 8103 |
| | learn | 6204 |
| | learning | 4257 |
| | least | 4642 |
| | leave | 18388 |
| | leaving | 9240 |
| | led | 15451 |
| | lee | 3587 |
| | leeds | 4522 |
| | left | 39454 |
| | leg | 5333 |
| | legal | 13103 |
| | legislation | 6965 |
| | legs | 6507 |
| | length | 7171 |
| | less | 35669 |
| | let | 23322 |
| | letter | 13589 |
| | letters | 7880 |
| | level | 25360 |
| | levels | 11894 |
| | lewis | 3730 |
| | liability ... living | |
| | loan ... lower | |
| | ltd | |
| | lucky ... lunch | |
| | lying | |

*Fig. 23*

DEVICE INTERFACE

CROSS REFERENCE TO RELATED APPLICATION

This application is a continuation of U.S. patent application Ser. No. 11/716,667, filed Mar. 12, 2007, which is a continuation of U.S. patent application Ser. No. 10/495,585, filed on Oct. 1, 2004, as a National Phase Application of International Application No. PCT/AU02/01114, filed on Aug. 20, 2002 which claimed priority to Australian Provisional Application No. PS 1072, filed on Mar. 13, 2002. Each of these applications, in their entirety, are herein incorporated by reference.

FIELD OF THE INVENTION

The present invention relates to a small computing device with an improved interface, and, particularly, but not exclusively, to a mobile communications device, such as a mobile telephone.

BACKGROUND OF THE INVENTION

It is desirable for small computing devices, by which we mean usually portable devices, such as lap-top-type computers and smaller, including mobile telephones, personal digital assistants, cameras and other devices, to be a small as possible for convenience.

The problem with making such devices small enough to carry is that it allows only a limited size for the interface. For example, in mobile telephones, a small screen and traditional numeric keypad are provided for the interface with the user. The numeric keypad input has been used for standard telephones for years, and was merely transferred for use in mobile phones with no significant adaptation. As mobile telephones become smaller and smaller, the traditional numeric keypad input becomes more and more difficult to operate. This is particularly the case where, as is usual for most mobile telephones today, it is required to input alphabetic characters in order to, for example, store contacts in the memory of the mobile telephone.

Further, the display screens provided for mobile telephones are, by necessity, also small where the phone is small. They are not able to provide, therefore, a view of a great deal of information at any one time.

There is a need for an improved interface for small computing devices, such as mobile telephone and PDAs.

SUMMARY OF THE INVENTION

In accordance with a first aspect, the present invention provides a small computing device, including a housing and a display screen extending along the face of the housing lengthwise, a first plurality of keys positioned adjacent one side of the screen and a second plurality of keys positioned adjacent the opposite side of the screen.

Preferably, the display screen extends for the majority of the length of the face.

Preferably, by "small computing device" is meant lap-top-type computer size or smaller, and is preferably PDA-type size or smaller, including mobile telephone size.

Preferably, the first and second plurality of keys are positioned in rows running parallel to the length of the display screen. Each row is preferably only one key in width.

Preferably, the small computing device further comprises a control means arranged to control operation of the small computing device, the control means being arranged to control the small computing device to operate in a plurality of operating modes, wherein the keys operate as multi-function keys.

Preferably, the control means is arranged to control the device such that the particular function of a key in a particular operating mode is designated by indicia appearing on the display screen. Preferably the indicia appear adjacent the associated key.

Preferably, the first plurality of keys comprises two or more keys and the second plurality of keys comprises two or more keys.

Preferably, the first plurality of keys comprises between four and ten keys and the second plurality of keys comprises between four and ten keys.

Preferably, the first plurality of keys comprises six eight keys and the second plurality of keys comprises six to eight keys.

Preferably, in one the plurality of operating modes, the keys are associated with numerics and operation of the keys is arranged to input numerals to the small computing device.

Preferably, there are at least five keys either side and each of the keys are associated in one operating mode with each of the ten digits of the decimal numeral system appearing as indicia on the display screen.

Preferably, in one operating mode, a scrolling function is provided which enables information on the display screen to be scrolled. Preferably, the scrolling function has a plurality of modes of scrolling. Preferably, each of the keys is associated with one or more of the modes of scrolling.

Preferably, the device does not include any standard numeric or alpha-numeric keypad. It may include a limited number of additional keys, such as "yes" or "no" and/or "direction" keys, but the majority of the functions of the device are preferably carried out by the first and second plurality of keys.

Preferably, in one operating mode, a plurality of the first and second plurality of keys are associated with a plurality of menu options. Selection of a menu option by actuating an associated key in this mode, then switches the device to a further operating mode where a plurality of the first and second plurality of keys are associated with a menu item within the selected menu option. Preferably, the number of menu items is equal to or less than the number of the first and second plurality of keys, enabling selection of a menu item by a simple two step operation of the interface, the first step selecting the menu option, the second step selecting the menu item within the menu. Note that operation is not limited to two step operation, and there may be modes where more than two steps of operation are implemented.

The small computing device preferably includes text sense means implementing a text sense function to facilitate input of text to the device. In a first text input operating mode, a user can select characters (eg. alpha-numerics) utilising the first and second plurality of keys. When one or more characters have been selected, the text sense means may propose a word or further characters to go with the characters already selected, and the user may select or deny the word or further characters.

The text sense means may also be arranged to provide a suggestion without a user having first selected characters of the word ie. text sense may be arranged to provide a suggestion for the start of the word.

Note that the text sense means may not always provide a suggestion which completes a word, and may provide a selection of one (preferably more than one) characters that may continue a word.

Preferably the small computing device is communications device and is preferably a mobile telephone. Preferably, a speaker area is positioned on the face of the housing above the screen, for transmission of sound to the user.

The small computing device of the present invention preferably has the advantage that it uses multi-function keys positioned adjacent the display screen, rather than a conventional numeric keypad (such as used on conventional mobile telephones), which enables more room on a face of the device for the screen so that more information can be displayed. Further, because the interface preferably uses "soft" buttons (ie. the buttons are multi-function) the function of the device can be altered easily by altering the software/hardware that drives the device. The interface is totally flexible and not limited by any dedicated operation (as normally is the case with conventional alpha-numeric keypads).

The small computing device may be controlled by the control means in a hard key operating mode. In the hard key operating mode, the keys are arranged to input data associated with hard labels appearing on the small computing device and not on the display screen (ie. not "soft" labels). For example, a plurality of the keys may be labelled with numerics and in a hard key operating mode may be operable to input numerics.

Preferably, a small computing device is arranged in one operating mode to act as a dedicated function device. Preferably, functions associated with the multi-function keys are pre-configurable and are arranged to operate in a dedicated mode ie. the multi-function keys become dedicated function keys. This feature can be used to implement small devices including telephones having dedicated operation. One example is a telephone which may be dedicated for operation by a particular person, such as a child, and be limited to, for example, being able to call only selected telephone numbers.

Functionality of the small device of the present invention may be implemented by appropriate software and/or hardware.

In accordance with a second aspect, the present invention provides a communications device including a housing and a display screen extending along a face of the housing lengthwise, a first plurality of keys positioned sequentially adjacent one side of the screen and a second plurality of keys positioned sequentially adjacent the opposite side of the screen, the device including means enabling the device to be worn by a user.

BRIEF DESCRIPTION OF THE DRAWINGS

Features and advantages of the present invention will become apparent from the following description of embodiments thereof, by way of example only, with reference to the accompanying drawings, in which;

FIGS. 20 and 21 illustrates views of two further embodiments of a small computing device in accordance with the present invention;

FIG. 23 shows an extract from a memory tree structure for implementing text sense.

DESCRIPTION OF PREFERRED EMBODIMENT

The following description of an embodiment of the present invention relates to a mobile communications device, in particular a mobile telephone. The invention is not, however, limited to a communications device, and may be implemented as any small computing device, such as a personal digital assistant (PDA).

A conventional mobile telephone comprises a controller for controlling operation of the telephone, usually in the form of a processor, a radio transceiver for communicating voice and/or text messages to and from the telephone, and an interface for input and output by the user.

A typical mobile telephone includes a housing which mounts the processor, radio transceiver communications and other required circuitry, the housing having one face which mounts the interface, comprising (usually) a twelve button numeric keypad, "yes" and "no" keys and "direction" keys, a display screen and a space above the display screen for a speaker area.

This traditional interface results in a number of disadvantages, particularly where there is a requirement for small telephone size. Firstly, the keypad area is very small, and operation is awkward.

Secondly, the display area is also very small so it is not possible to display a great deal of information at any one of time.

The limitations of this interface are an even greater problem now that far more functionality is required of mobile telephones. Common activities on mobile telephones include:

Menu selections for controlling settings
Managing and selecting from an address book
Sending, receiving and viewing text messages
Browsing Internet data in either WAP or HTML format
Specialised applications such as calculators, games, world time clocks etc.

The traditional numeric keypad interface hampers these activities greatly as it is a far from ideal method of controlling text input. For example, in order to input text, it is necessary to actuate a key four times in some cases to enter a letter.

Figure 1:
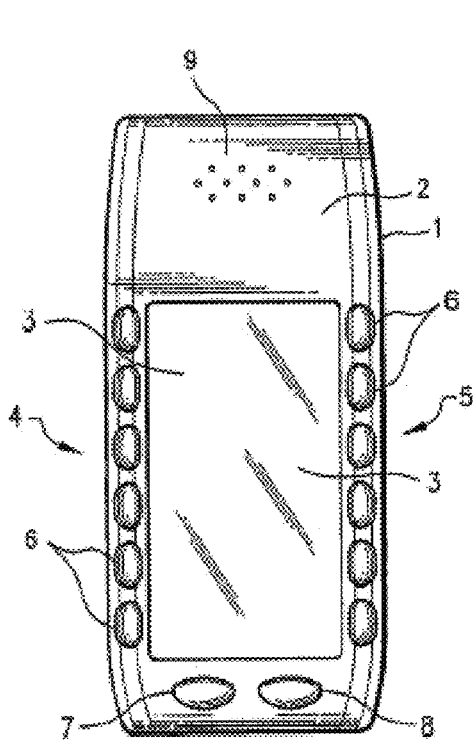
FIG. 1 is a front view of a small computing device in accordance with an embodiment of the present invention, in this example being a mobile telephone.

FIG. 1 of the drawings is a front view of a mobile telephone in accordance with an embodiment of the present invention. The telephone includes a housing 1, which in this embodiment mounts internally mobile telephone circuitry (see later), and has a front face 2. The front face 2 mounts an interface which includes a display screen 3. The display screen 3 may be any convenient type of display eg. LCD. The display screen 3, as can be seen, takes up the majority of length of the face 2 of the housing 1. This is a much larger display space than typically available for a mobile telephone.

Additionally, the interface includes a first row of keys 4 and a second row of keys 5, the rows 4 and 5 in this embodiment extending in a line along the face of the housing on either side of the display screen 3. Each of the keys 6 in the rows 4 and 5 are controlled as "multi function" keys in this embodiment. The interface is arranged such that a function of a particular key 6 at any time will be indicated by dynamic labels appearing next to the key 6 on the display screen 3, controlled by the device processor (see later). The functions change depending on the activity the user is performing.

The interface does not include any standard alpha-numeric key pad. In this embodiment a "yes" 7 and "no" 8 key is included positioned below the screen, and can be associated with the usual "yes" and "no" functions eg. to initiate a telephone call ("yes" button) or finish a telephone call ("no" button).

Space is provided for a speaker area 9 on the front face 2 above the screen 3.

With this format it is possible to perform all current cell phone activities using the multi-function keys and new functions such as electronic mail are made feasible. The format is sufficiently versatile to be more capable of implementing future functions, depending on software/hardware provided in the device. It is also possible that various "personal digital assistant" (PDA)-type functionality could also be implemented using this interface eg. calenders, diaries.

Figure 2:
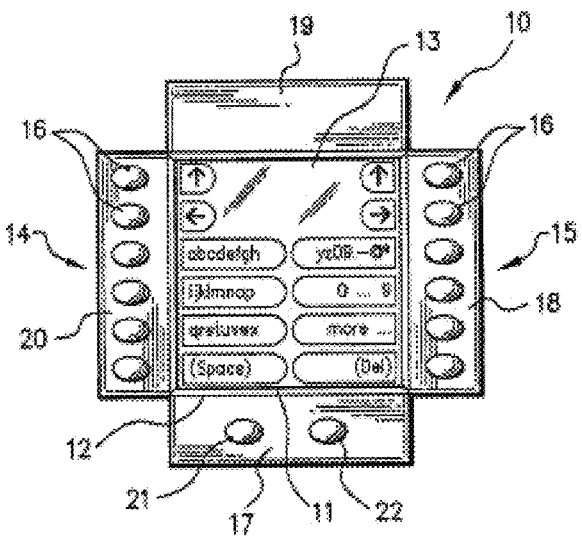
FIG. 2 is a front view of a further embodiment of a small computing device in accordance with the present invention.
Figure 3:
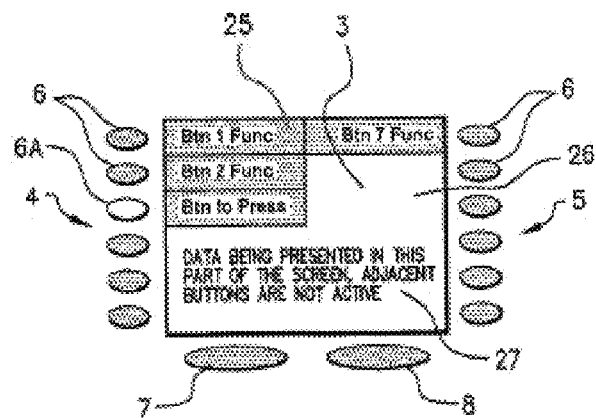
FIGS. 3 to 13 are schematic representations of an interface of a small device in accordance with an embodiment of the present invention, for the purpose of illustrating various functions of the interface.

A further embodiment of a small device in accordance with the present invention is schematically illustrated in FIG. 2. FIG. 2 illustrates a small device 10 which may resemble such items as a watch, pager or pendant. The device 10 includes a housing 11 which mounts on one face 12 an interface including a display screen 13 and first 14 and second 15 rows of keys 16. In this embodiment the key 16 may be on the side of the device rather than on the face 12, and in the FIG. 2, the areas 17, 18, 19 and 20 are folded down ie. they are the sides, top and bottom, of the housing 11. "Yes" 21 and "no" 22 buttons are provided at the bottom 17 of the device 10.

This small device may be a communications device, a PDA, or any other small computing device. One advantage of this type of device is that it could be worn rather than carried which means the user may have the device with them at all times. Such a device could become ubiquitous.

In the embodiments of both FIG. 1 and FIG. 2, because the keys are placed in a row, they can be conveniently separated so that a finger does not overlap more than one key when a key is pressed. This results in easy control of a small device compared to, for example, the standard alpha-numeric keypads on small telephones, which are very clumsy to deal with.

Another advantage of the arrangement of both FIG. 1 and FIG. 2 is the larger screen, which provides the ability to be able to see more text at a time, see more of the context of what is being read. It is also possible that images and more complicated documents may be viewed.

It is believed that the interface also enables faster, easier text entry (see later on how text may be entered) so that it is easier to use text based services such as SMS and e-mail. Further, because of the large screen and the multi-function keys it is possible to implement a simpler, more intuitive menu operation (see later). The interface enables many options to be presented at once rather than one at a time as is conventional with typical mobile telephones.

Further, this device does not require any particularly new manufacturing techniques over those already used for a conventional mobile telephone and PDAs. The internal hardware of a mobile telephone, for example, may be similar (although, of course it may vary). It is merely the arrangement of the display and the keys that is altered.

A major advantage, as discussed above, is that as functions and labels for the keys may be software driven, the functionality of the device can be altered merely by altering software. It is therefore possible to produce devices that have different functionality, but the same hardware ie. the same interface and internal components. For mobile telephone type devices, this is presently very difficult because of the dedicated alpha-numeric interface. One particular advantage of this is that this is by altering software the language of operation of the device can be altered. Operation could include operation in Chinese characters, for example, utilising the same interface and the multi-function keys.

The following description describes different functions that may be implemented in the mobile telephone or other mobile communications device utilising this interface. It will be appreciated that the device of the present invention is not limited to the functionality described in the following, however, and many different functions may be implemented with this device with this interface.

FIGS. 3 through 13 of the drawings are schematic representations of the interface of a device in accordance with an embodiment of the present invention, for the purposes of illustrating some of the functions which may be implemented utilising this interface.

In the diagrams of FIGS. 3 to 13, similar reference numerals have been used to the embodiment of FIG. 1, to indicate the rows 4 and 5 of keys 6, "yes" 7 and "no" 8 keys and the display screen 3.

When illustrating operation of the device in the diagrams of FIGS. 2 through to 13, with an unshaded key 6a pressing of that key switches operation of the device onto the next step. The shaded boxes 25 on the display screen are active labels which designate the function of the adjacent key. If a box 26 adjacent to a key is unshaded it means that the associated keys are not active in that operating mode. The area 26 may be blank or used for displaying data 27. Note that the reference numerals 6a, 25, 26 and 27 have been used only in FIG. 3. For the purposes of clarity, these reference numerals have been omitted from the other FIGS. 4 through 13, instead the operation of the interface being indicated by appropriate shading as discussed with reference to FIG. 3.

Figure 22:
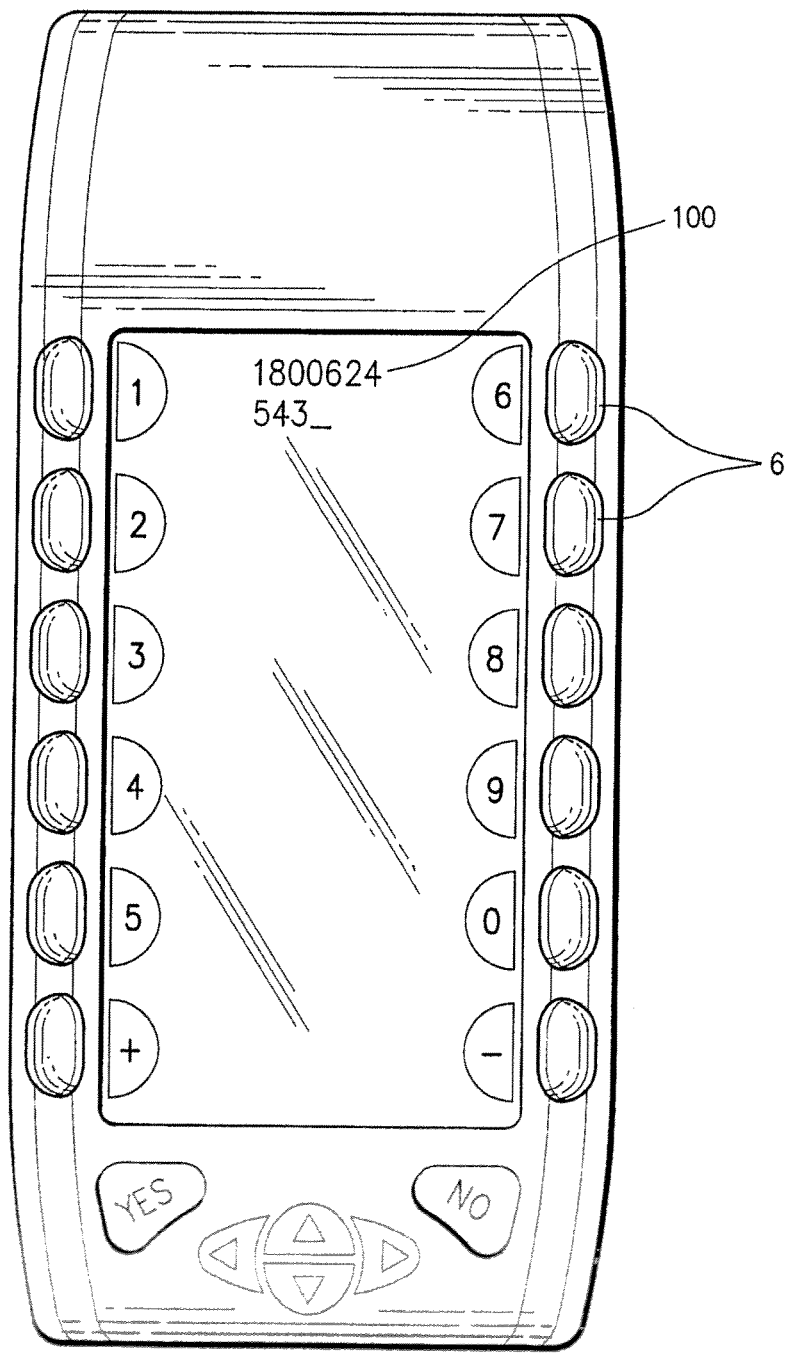
FIG. 22 is a front view of a device in accordance with an embodiment of the present invention showing a further operating mode.

FIG. 22 illustrates an embodiment where the soft labels on the screen do not take up the whole screen width and entry may be made on the screen between the labels. In this case numeric entry 100 is indicated.

Numerical Entry

Figure 4:
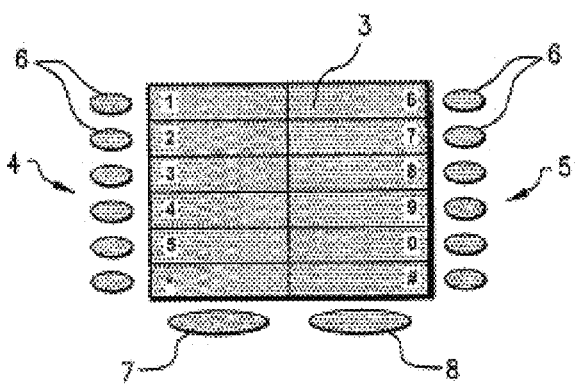

FIG. 4 illustrates an operating mode enabling simple numeric entry into the device. Each of the keys 6 is associated with a numeral or a * or a #. This is equivalent to a standard numeric keypad on, for example, a standard mobile telephone. The difference here is that the keys 6 are dynamic and this "numeric keypad" is one operating mode only. Pressing "yes" 7 enables the telephone connection and pressing "no" 8 would be used to hang up, disconnect or abort the function. Note that an area for display of the number that is input in may be provided on display screen 3 (area not shown).

Text Entry

Many options may be implemented for the entry of text. Current methods used on typical mobile phones such as the multi-press system (wherein one key may be pressed to choose between several letters) or more advanced methods such as the T9 (wwww.tegic.com) could be implemented utilising the device of the present invention, by simply making in one operating mode the 12 keys 6 of this embodiment correspond to the standard alpha-numeric keypad keys for a mobile telephone. With the extra flexibility of the dynamic labelling of the keys, however, it is possible to implement more powerful and user friendly text input.

The applicant's co-pending patent application (PCT/AU01/01467) describes a method and system for text entry which can be utilised by the device of the present invention. The disclosure of the referenced patent application is hereby incorporated in this application.

It is also possible to have text input on a more advanced level where knowledge of language allows the device to significantly streamline the process of word entry. Text entry will be described in more detail later.

Menuing

Figure 5:
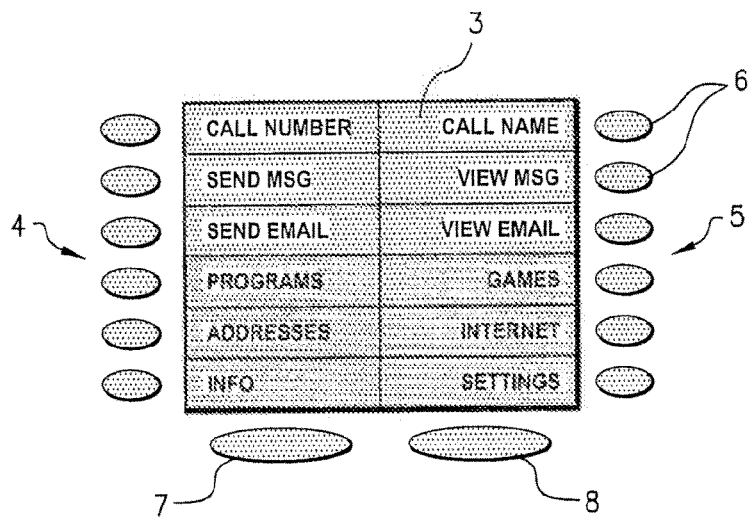
Figure 6:
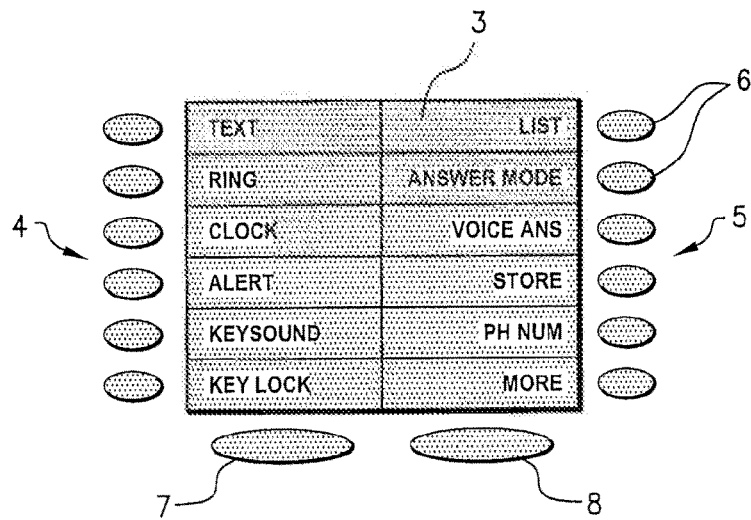
Figure 7:
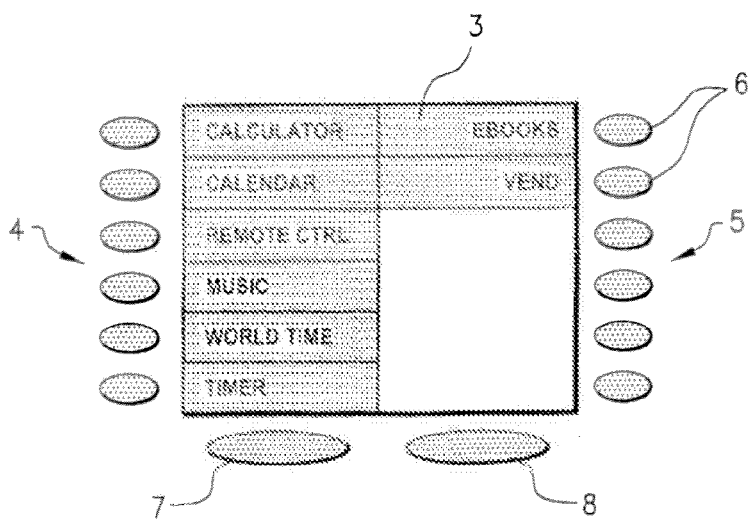

Typical mobile telephones allow selection from an array of menu options by requiring the user to navigate through a "tree", generally one option at time, using "direction" keys. This limits the user to a "tunnel vision" view of the interface and results in many key presses required to perform any one function. In the device of this embodiment of the present invention, however, utilising the multi-functions keys, many menu options can be presented to the user at any one time and if it is desired any of those options may go on to a further menu of more options (depending upon the number of multi-function keys available). For example, with the twelve key embodiment illustrated in the drawings, a menu structure with 144 options could be implemented and the maximum number of key presses required for a user to get to any single option would be two (although other operating modes may require more). FIGS. 5 through 7 illustrates some typical menus that may be utilised in the small device of this embodiment. FIGS. 5 and 6 show twelve menu options, each one associated with a key 6, eg in FIG. 5 options include "call number", "send msg", "send email", "programs", "addresses", "info", "call name", "view msg", view email", "games", "internet", "settings". In FIG. 6 the options include "text", "ring", "clock", "alert", "key sound", "key lock", "list", "answer mode", voice ans", "store", "ph num", "more . . . ".

Note that FIG. 6 represents "settings" menu selectable via the interface of FIG. 5. The FIG. 6 display also enable a selection of "more" settings.

In FIG. 7 (the "programs" menu) there are only eight options and the other four keys 6 are not required. These options include "calculator", "calendar", "remote ctrl", "music", "world time", "timer", "ebooks", "vend".

It will be appreciated that any menu option may be included depending upon the functionality of the device.

Option Selection

Within any menu it is possible in the present device make an operating function correspond to an option selection (ie. selection of a particular menu item within a menu). In the present embodiment, on-line screen labels for the option are highlighted to indicate the current selection state. In FIGS. 8 through 11 this is illustrated by underlining in the diagrams.

Binary Option

A binary option is either on or off and may be toggled in place by pressing its associated key.

Figure 8:
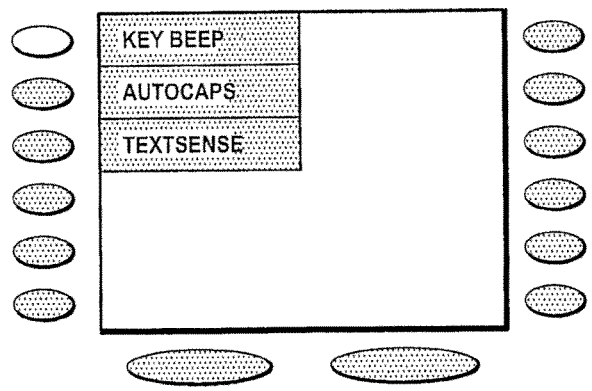

FIG. 8 illustrates a text setting menu with the "key beep" off.

Figure 9:
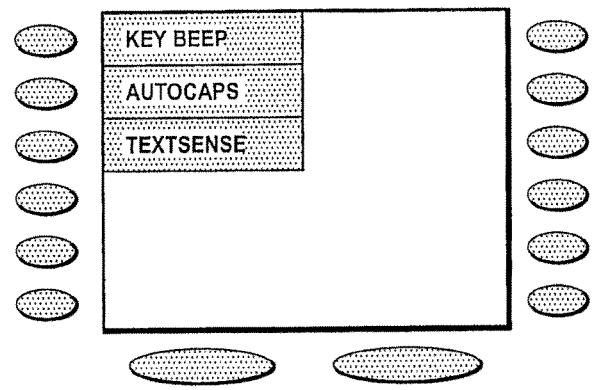

FIG. 9 illustrates a text setting menu with the "key beep" on. This is a binary option.

Multiple Selection Option

A multiple selection option enables a user to choose one or more items from a list of several items.

Figure 10:
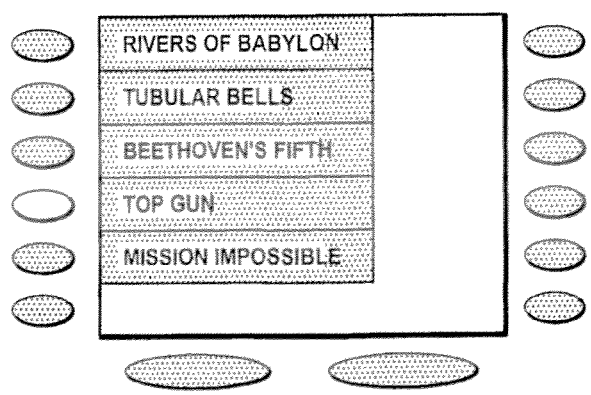
Figure 11:
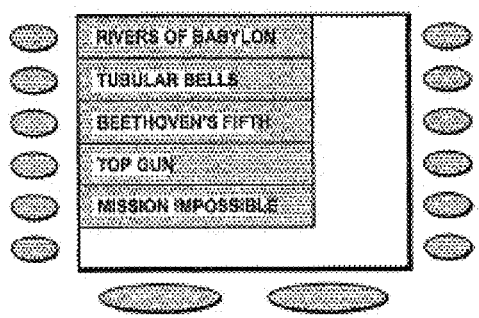

FIG. 10 illustrates the ring melody menu for a telephone with the original setting "Rivers of Babylon". FIG. 11 illustrates the ring melody menu with the setting changed (multiple selection option).

Scrolling

Figure 12:
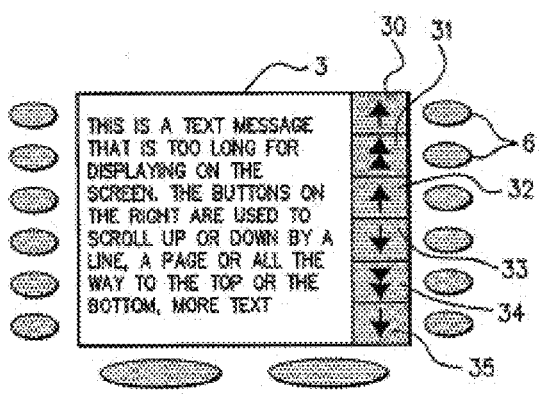
Figure 13:
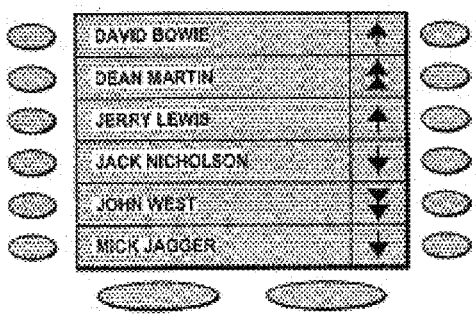

FIGS. 12 and 13 illustrate how scrolling of the display screen 3 may be implemented utilising this interface. In the case where a long document is received in the device, such as a text message, e-mail or Internet page, scrolling such as illustrated in FIG. 12 may be implemented. Using universally recognised symbols associated with keys 6 on the right hand side of the lay screen 3, this operating mode implements scrolling. Indicia 30 indicates that pressing the associated key 6 would move the display to the top of the document. Indicia 31 indicates that pressing the associated key 5 would move the document up a page. Indicia 32 indicates that pressing the associated key 6 moves the document up a line. Indicia 33, 34 and 35 have the equivalent functions in the opposite direction to 32, 31 and 30 respectively.

FIG. 12 illustrates scrolling as applied to a document. FIG. 13 illustrates scrolling as applied to a menu. This option may be used when there are more menu options to display then will fit on the display screen. In this case, the row of buttons 4 is associated with menu selection and the row of buttons 5 on the right hand side is associated with the scrolling function. FIG. 13 illustrates a phone book function where six addresses (of David Bowie, Dean Martin, Jerry Lewis, Jack Nicholson, John West and Mick Jagger) are visible at any one time. To select one that is visible the user would press the relevant associated button in the row 4 and to see more they use the scroll control associated with keys in row 5.

Text Sense

Figure 15:
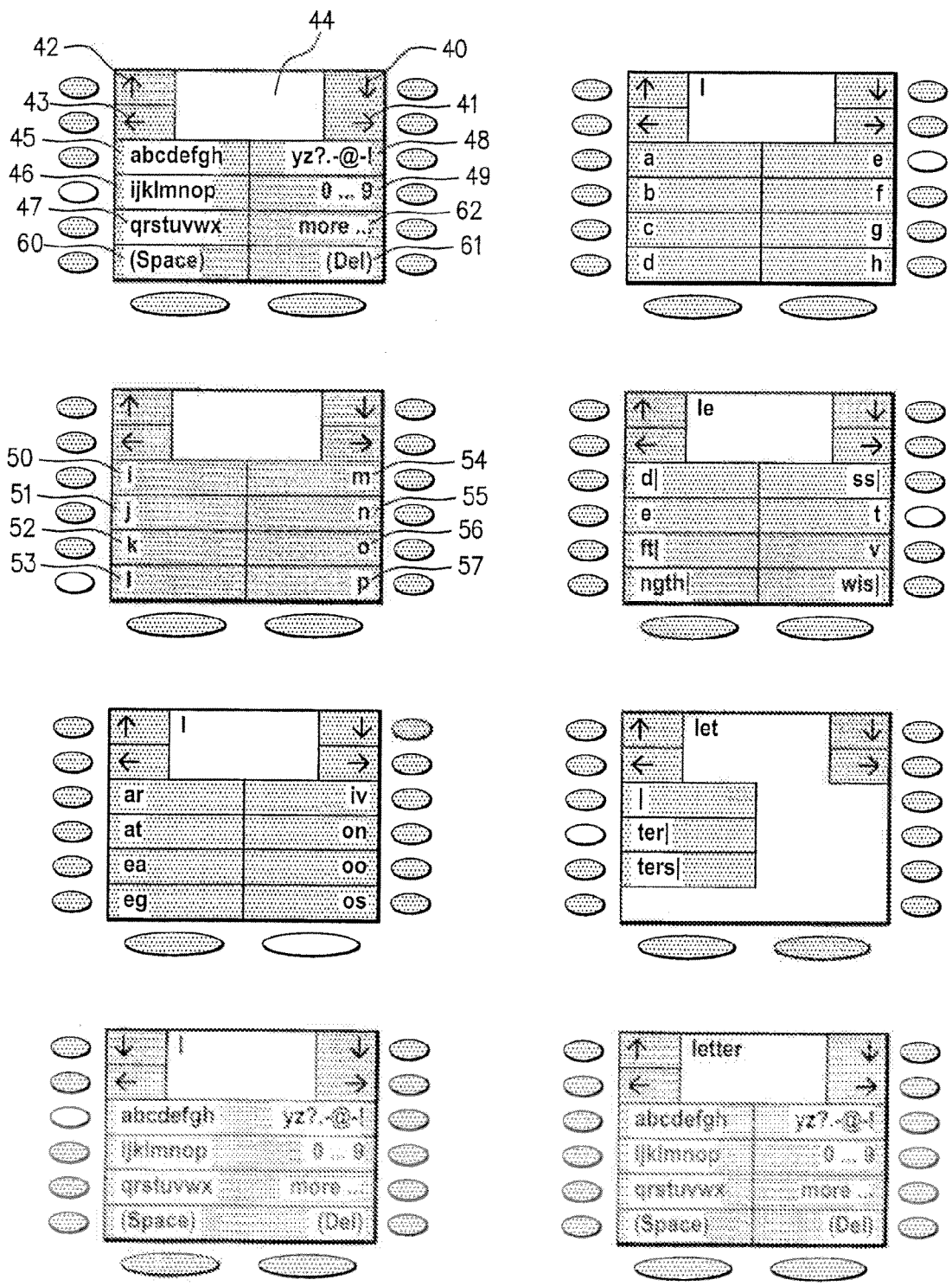
FIG. 15 shows further schematic representations of an interface for a small computing device in accordance with an embodiment of the present invention, illustrating further functionality of the interface.

A text sense function utilising a device in accordance with the present invention will now be described with reference to FIG. 15. FIG. 15 shows 8 diagrams of the interface of the small device of the present invention, each diagram illustrating a different stage in input of text into the device. The same reference numerals are used for components equivalent to the components already described above. Note that in the operating mode of FIG. 15, the two top keys on each of the rows 4 and 5 of the keys 6 are associated with "direction" indicia 40, 41, 42, 43. A space 44 on the display screen is available to indicate the results of characters entered using this operating mode. The other keys are associated with dynamic functions illustrating text entry, as will become clear from the following description.

The applicant's previous patent application (PCT/AU01/01467) discloses a system which may be used to enter any symbol (text, numerics, punctuation etc) in a very flexible and efficient manner. The system is essentially "two-step". Referring to diagram 1 of FIG. 15, the four lower keys 6 in each row 4 and 5 are associated in this operating mode with functionality which corresponds to the text input functionality described in applicant's earlier patent application. The "soft key" indicators include four soft keys 45, 46, 47, 48 which together offer "groups" of characters which make up the standard Arabic alphabet. Soft key 48 also includes other characters such as "?" "." etc as illustrated. Selection of one of these soft keys by actuation of the associated key 6, results in a selection of that "group" of characters.

For example, if the user wishes to input the character "l" they select soft key 46 by actuating the associated key 6. This results in selection of the group of characters illustrated on the soft key 46 and switches the device to a further operating mode as illustrated in diagram 2 of FIG. 15. In this operating mode, each of the lower four keys 6 of the rows 4 and 5 are associated with a soft key representing one of the characters of the group of the soft key 46 in diagram 1. Soft keys 50, 51, 52, 53, 54, 55, 56, 57 are associated with respectively the characters "i", "j", "k", "l", "m", "n", "o" and "p". The user actuates the key associated with the soft key 53 and this results in input in the character "l" to the device.

In the system described in the applicant's earlier patent application, at the same time as the character "l" is input by actuation of soft key 53, or after, the device switches back to the operating mode illustrated in diagram 1 and the user can select a further group of characters designating the next character that they wish to enter into the device 44. This simple "two-step" character entry operation has significant advantages over conventional character entry, such as that utilising conventional alpha-numeric key pads.

In an embodiment of the present invention, however, a further improvement may be achieved by utilising a "text sense" operating mode.

As well as the numeric and alphabet soft keys 45, 46, 47, 48, there are also numeral 49 soft keys, a key 60 for "space", a key 61 for "delete" and a key 62 for "more" options.

As the user enters text they are presented with "best guesses" of the next one or more characters they are entering. The user has the choice of selecting one of the "best guesses" and having that section of the word filled in for them or explicitly entering the next character. Which ever option, as soon as the action is complete, the system takes another "guess" and the cycle repeats until the end of the word.

As a user gets further into a word, the number of possibilities for the word decreases dramatically. At the start of a word, the "best guess" may not include an option for progressing the intended word. If this is the case, the user must select the next character explicitly and allow the text sense functionality to guess based on this more explicit start string.

Also, at the start of the word the permutations for the conclusion for the word may be so great that text sense does not proffer the entire end of the word, just the next one, two or more character blocks.

Whatever the case, the end result is that the user can enter medium to large words with significantly less key strokes or button presses than if they had typed all the characters of the word.

Referring again to FIG. 15, the following is an example entry sequence which utilises text sense (in this example, to enter the word "letter").

1. This is the opening screen of the standard text entry system of applicant's earlier application. The user wants to enter "l" so they select the character group containing "l": "ijklmnop".
2. Each of the characters from the group is now presented to the user and they select "l".
3. The user has now entered "l" as the start of their word and Text Sense is now guessing the next two characters of the word based on its knowledge of the language. Thus we would look for "et". There is "ea" and "eg" because these are a more likely 2 character sequence than "et" at this stage so we have to reject the option presented by pressing "no".
4. We are back to the explicit character entry mode. We want to enter the letter "e" so we select "abcdefgh".
5. And then we select "e".
6. We have now entered the string "le" and Text Sense is having another guess at the rest of the word. It has determined that it can only offer the next single letter but as some of those options only have one word under them it has offered the entire rest of that word. For instance the dictionary only has one word starting with "len" and that is "length". So rather than offering "n" then "g", etc it offers the entire rest of the word. The "|" character at the end of the string indicates that that option will terminate the word. Note: the system has several "lea . . . " and "leg . . . " words but it has not proffered "a" or "e" at this stage as it has already been determined at stage 3 that the word being entered is none of these. We now select "t" to continue our word.
7. Now that "let" has been entered, the system has only matches for the word "let", "letter" or letters". As these will all fit on the screen it presents all three. Selecting "|" would terminate the word as it currently stands and give us "let". We select "ter|" which will add "ter" to our entry and terminate the word.
8. Thus we have entered word "letter".

In the above description, the numbers in the left hand column are equivalent to the numbering of the diagrams in FIG. 15. Reference numerals have not be designated for each of the soft keys of diagrams 3 through 8, for the purposes of clarity. The reader will appreciate that the characters indicated in the diagrams designate the functionality of the associated soft key ie. selection of that soft key selects and enters the characters that illustrated on that soft key. A "|" on a soft key indicates the end of a word.

The following description is of one method of implementing text sense note that text sense will be implemented by appropriate software running on the control means, to provide a text sense means. The following description of text sense implementation refers to FIG. 23.

Data Structure

The internal data of the system is built up from a list presented to the system which contains all the words upon which to base guesses as well as an integer indicating a frequency of usage of the word. The frequency number does not have an absolute significance, it is only a representation of the frequency of usage of the word in relation to other words in the file.

As words are fed into the system a letter by letter tree structure is built. For example all words starting with "l" have a pointer from the top "l" node. Under "l" is a node for every letter that any word has following the letter "l". This goes on down the line until the end of the word is reached. For each node down the line a count of the frequency of all the words below it in the tree is maintained. This represents the frequency value for all words that start with the string down to that node.

Note: in a standard implementation you would also include in-word punctuation characters as well such as " " and "-"

FIG. 23 is a representation of the raw data (on the right) and the corresponding tree structure (on the left) built up internally for words starting with "le".

Section of String to Present

Given the first character(s) of a word, the system travels down the tree to the node that represents that start string. For instance, given the string "let" it would first go to the top "1" node then the "e" node under that then "t" node under that. This would bring us to the node that is shaded in the table above.

Note: if in travelling down the tree, the letters indicated a node that didn't exist this would meant that the user had entered the start of a word that isn't in the dictionary and thus we would leave them to complete the word with explicit character entry.

Having got to the node for "let" we see that there are three possible words underneath ("let", "letter" and "letters") so we present all three as they will fit on the screen.

A more involved example is if the user has only entered "le" this brings us to the large "e" node on the left of the above table. As we can see, there are many words under this. We would first look down one character and find that there are 10 possibilities ("a", "d", "e", "f", "g", "n", "s", "t", "v", "w"). As we have eight positions on the screen (not much less than 10) we go down another level to the next two characters on from "le". This then gives us nineteen possibilities (ad, ag, ar, as, av, dl, el, ed, ft, gl, ga, gi, gs, ng, ss, tl, tt, ve, wi). This now significantly exceeds our eight positions so out of the nineteen possibilities we pick the eight two character strings which have the highest frequency total for the tree below the, we then present the.

Strings not Re-Presented

As the word is entered it is often possible for a combination to be considered which has already been ruled out by a previous set. In our example entry sequence (above), in step 3 we were presented with "ea" and "eg" but we wanted "et" so we explicitly entered "e". Thus it would be possible at step 6 of the example to present "a" and "g" but this is unnecessary as we know that these are not part of the desired word. In order to avoid representing a word we flag all nodes that have been presented so that when we are selecting candidates we treat flagged nodes as if they were not there.

When the end of the word is reached the flags are reset ready for the next word.

Dynamic Learning

As well as the initial word list that the system is loaded with, the system also optionally learn new words as the user uses them.

As words are entered that the system knows it boost the frequency value of word giving it greater priority in subsequent usages. When the user enters words that the system does not know then the system could add these to the word list so that they are available for guessing with in the next instance.

For this to work, the data set must be stored in persistent storage between activations of the system.

Figure 24:
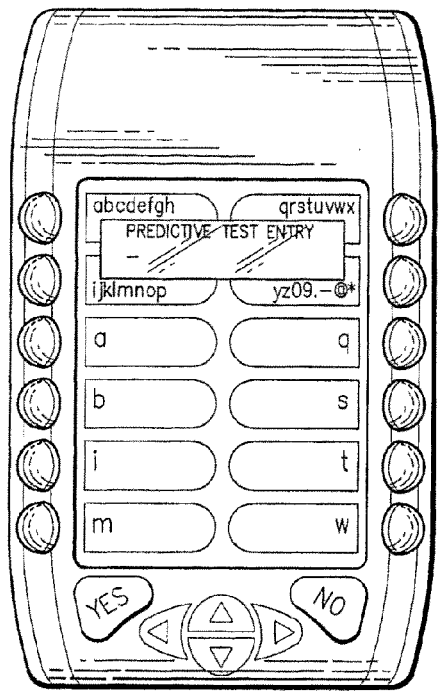
FIGS. 24 to 26 are front views of a device in accordance with embodiments of the present invention showing further operating modes.
Figure 25:
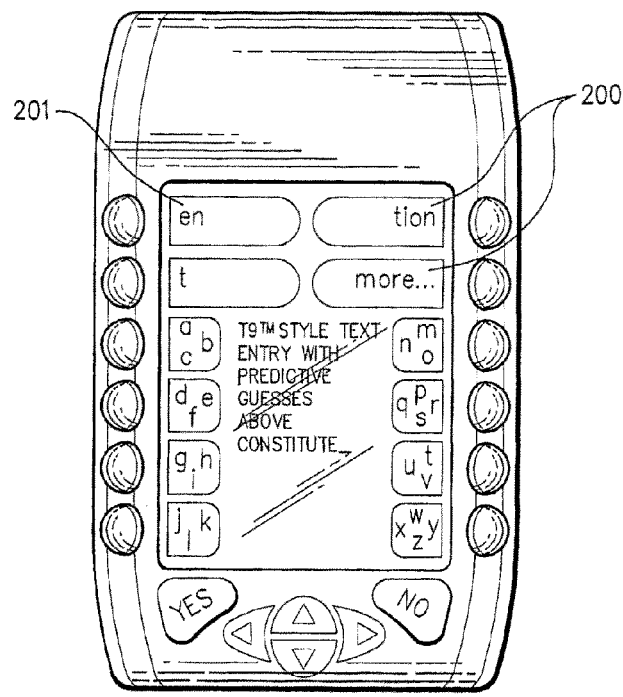

FIG. 24 illustrates a front view of a device in accordance with an embodiment of the present invention illustrating one form of interface for text entry. FIG. 25 illustrates another form of interface which is modelled on the T9 style text entry with predictive guesses shown by indicators 200, 201.

Dedicated Keypad Operation

In accordance with a further embodiment of the present invention, the small device may be configured to operate in a dedicated operating mode which is pre-configurable, either by the manufacturer or by a user of the device so that the device cannot be easily switched from this one operating mode (for example it may have to be returned to the manufacturer or alternatively a user may have to enter a security code to switch the operating mode).

Utilizing the present invention, because the keys can be associated with soft keys implementing any function which is enabled by the hardware/software of the device, the device can be configured in any dedicated operating mode.

Figure 17:
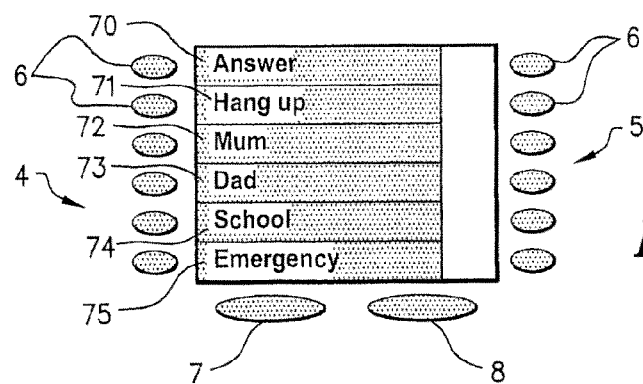
FIG. 17 is a further diagram of an interface of a small device in accordance with an embodiment of the invention, illustrating a further functional operation.

One example of an operating mode is described in the following, with reference to FIG. 17 of the drawings. FIG. 17 is a further diagram illustrating use of the interface of the small device of the present invention, in the case as applied to a mobile telephone. The same reference numerals have been used to designate the same components as in the previous drawings.

The small device of this embodiment of the present invention has been pre-configured, either during manufacture or by application of a configuration step by a user (eg. a parent) to configure the telephone in a "kids" mode, as illustrated.

In this "dedicated" mode, the operation of the telephone cannot be changed, unless it is reconfigured by the manufacturer or by the parent (on entry of an appropriate security code, or other security operation). In this "kids" mode the keys 6 in the left hand row are associated with soft keys which include limited operations only such as "answer" 17, "hang up" 71 and stored numbers for dialling "mum" 72, "dad" 73, "school" 74 and "emergency" 75.

Such a pre-configured telephone could be provided for a child's use, in the sure knowledge that they could not use the phone to dial any other numbers, and also would find the telephone very simple to operate and use in an emergency or to call school, mum or dad (or any other pre-configured number that may be required).

Figure 26:
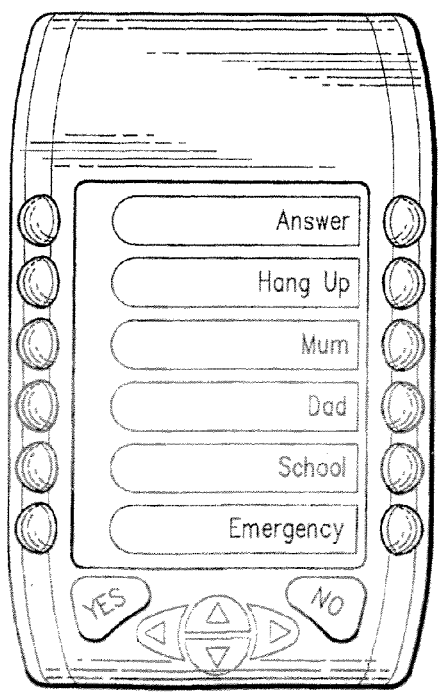

FIG. 26 illustrates a front view of a device in accordance with an embodiment of the invention in "kids" mode.

As discussed above, it will be appreciated that any functionality could be implemented in the pre-configured mode, and the invention is not limited a "kids" mode only.

The pre-configuration could take place at the factory ie. devices with this interface could be produced with dedicated functions, or a multi-function device may be produced in which at least a plurality of the keys may be "locked" into one particular function. Security means, such as a PIN, may be available to unlock function if it is wished to return the device to multi-function operation.

Hard Key Operating Mode

Figure 18:
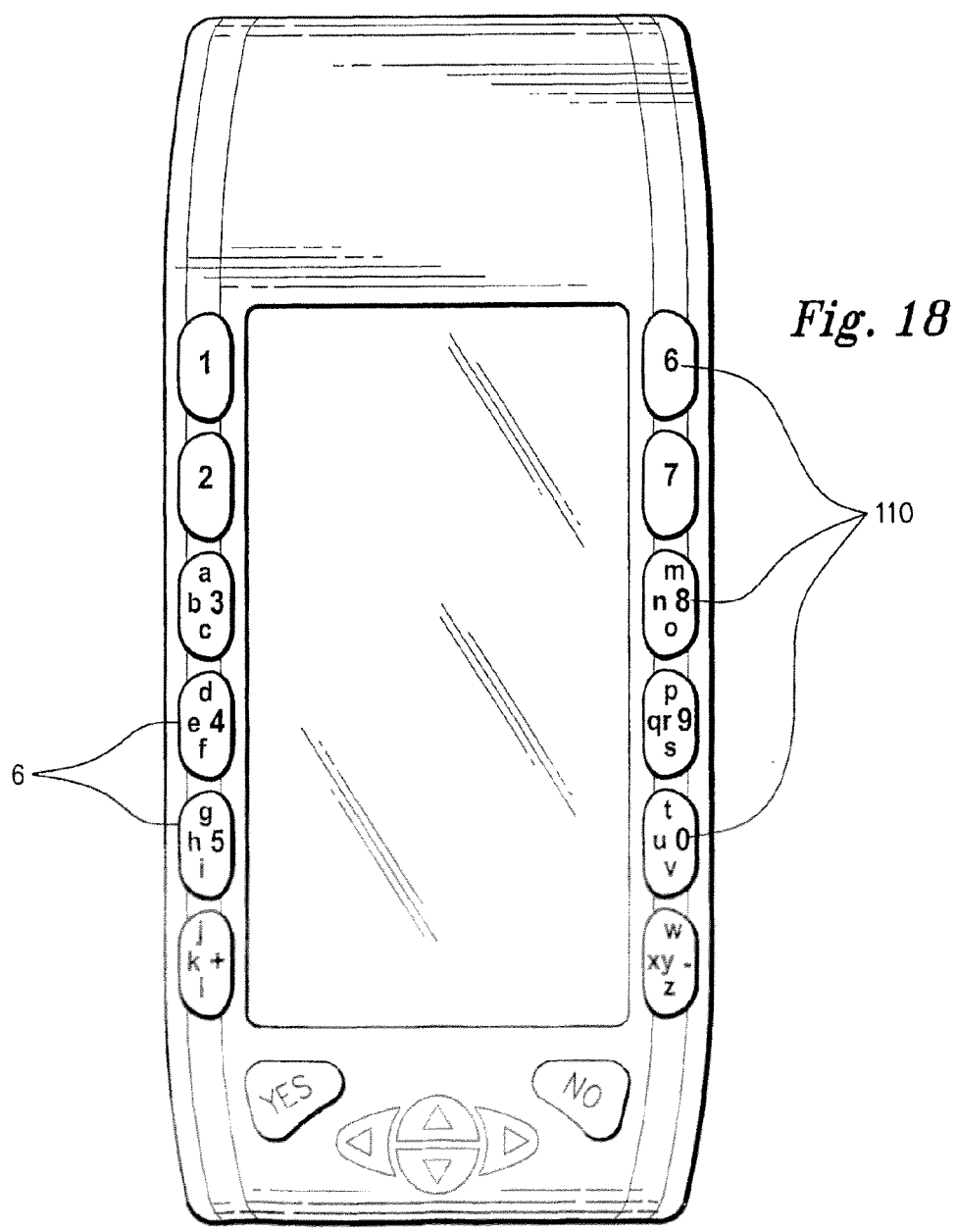
FIG. 18 is a front view of the further embodiment of a mobile telephone in accordance with the present invention, illustrating hard key labels for operation in a hard key mode.
Figure 19:
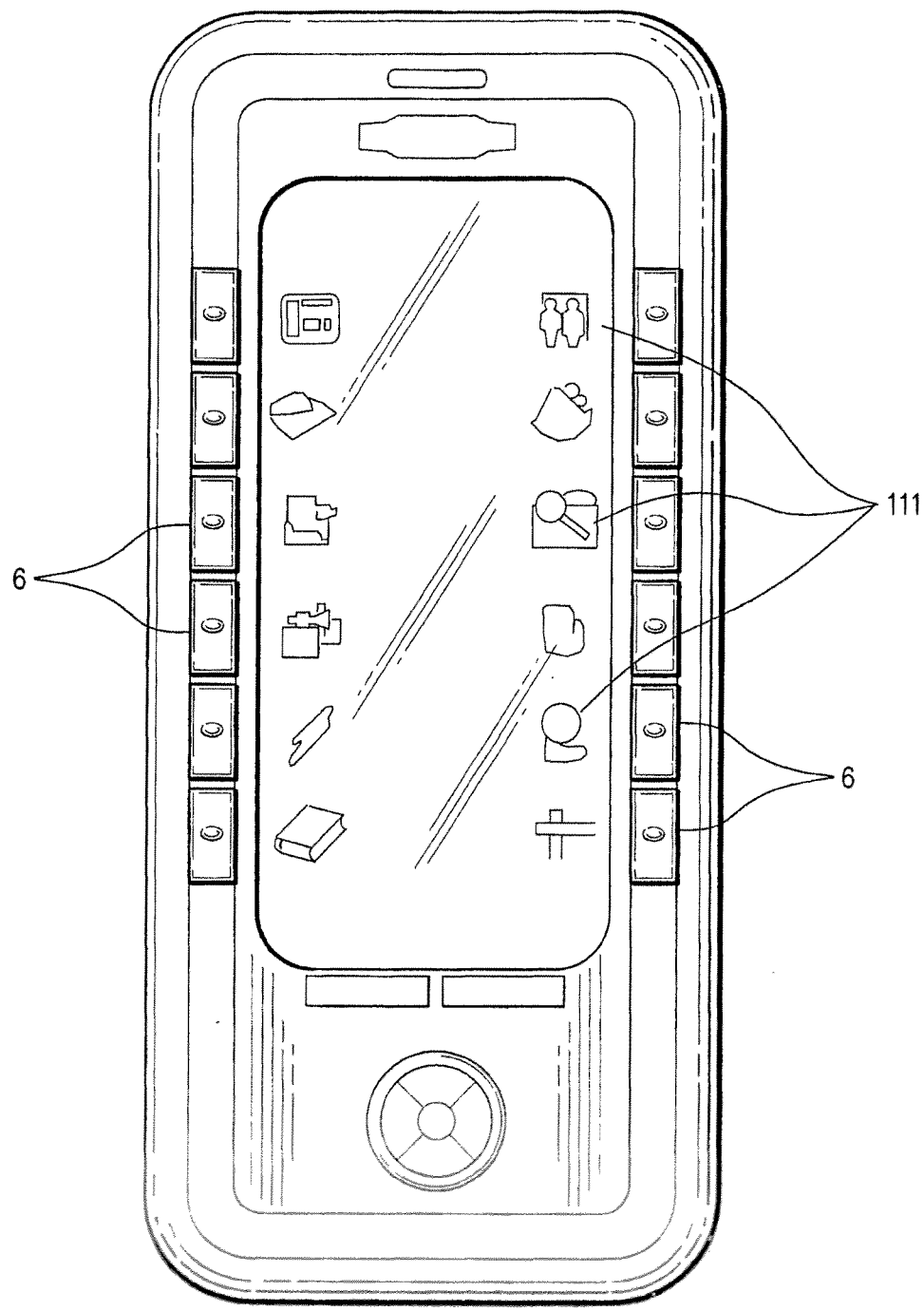
FIG. 19 is a front view of a further embodiment of a small computing device in accordance with the present invention, illustrating an icon interface operating mode.

The control means may control the operation of the device to provide a "hard key" operating mode. In the hard key operating mode, operation of the keys is not associated with a soft label is on the display screen, instead a hard label is associated with the key, eg. on the key. FIG. 18 illustrates a front view of a device in accordance with an embodiment of the present invention illustrating hard labels 110 on the key 6. In this embodiment, the hard labels are alpha-numerics. When switched to the hard key operating mode, all the display screen is available for information entry in accordance with the hard labels. The device may be switched between hard and "soft" operating modes.

There may be a number of hard operating modes.

Icon Operating Mode

FIG. 9 illustrates an embodiment of a small device in accordance with the present invention which utilises icons to indicate functionality of the key 6 in an icon operating mode. The icons 111 may indicate any operating function which is implemented by the device eg. address book, diary, calendar, world time, etc.

FIGS. 20 and 21 illustrate a view of further embodiments of small computing devices in accordance with the present invention. FIG. 20 shows a front view, FIG. 28, side view from one side (FIG. 20B) illustrating direction keys 112 on the side, side view from the other side (FIG. 20C) rear view (FIG. 20D) indicating a battery cover 113, top view (FIG. 20E) and bottom view (FIG. 20F). FIG. 21 illustrates similar views for a further embodiment, with the same reference numerals indicating similar components.

Figure 16:
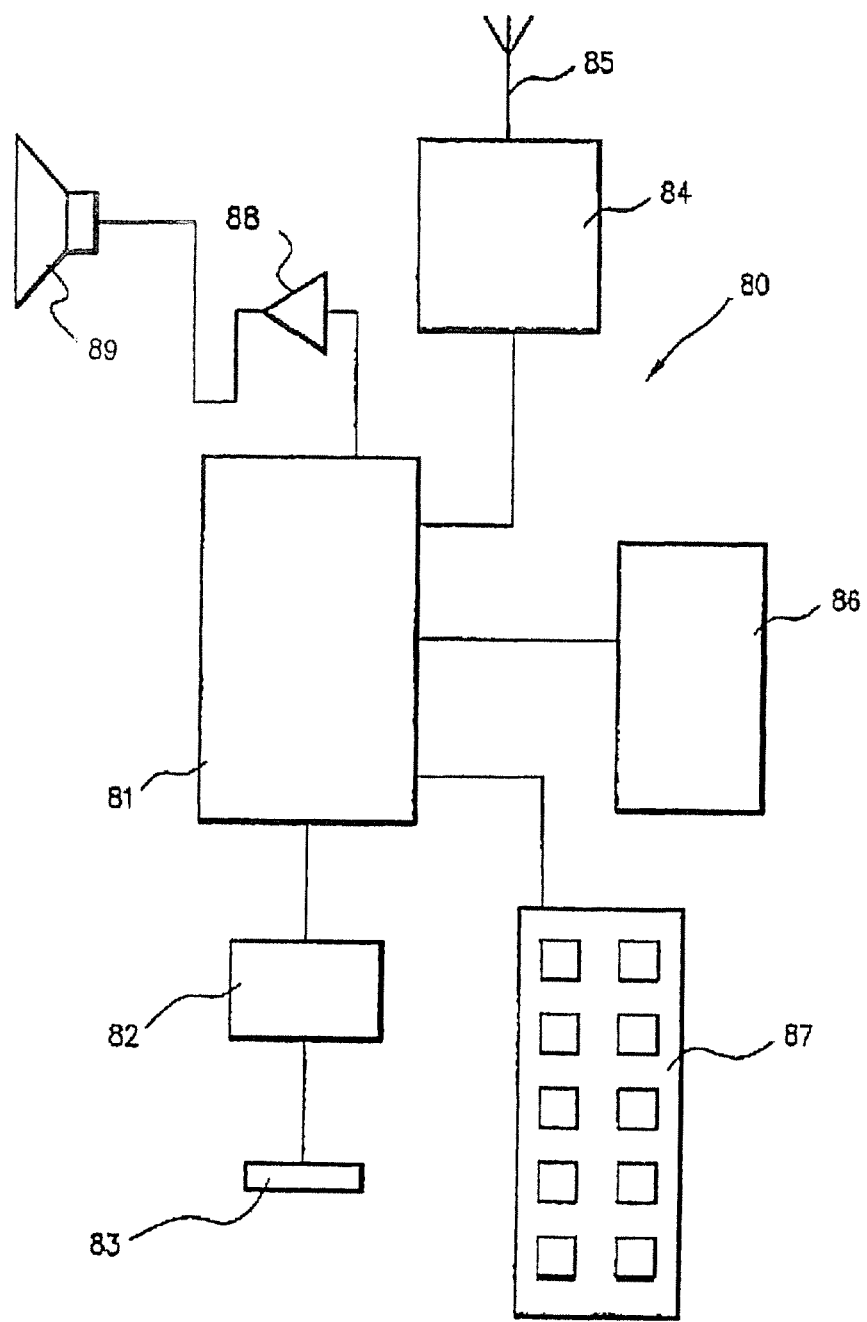
FIG. 16 is a schematic block diagram of componentry of an embodiment of the present invention in the form of a mobile telephone.

It will be appreciated that functionality of the small device may be implemented by appropriate software and hardware which is well within the scope of the skilled person in order to implement the "soft key" and other functionality required. For the sake of completion, FIG. 16 is a block diagram which illustrates one way only in which the hardware of a mobile telephone in accordance with an embodiment of the present invention may be implemented. This hardware, generally designated by reference numeral 80 is mounted in the housing 1 of the small device.

The components include a control means in the form processing means 81, which may include an onboard or off-memory and a processor(s) arranged to control operation of the device. The processing means 81 may in fact include multiple processes eg. SIM card, DSP (Digit Signal Processor) and conventional processor for controlling other operations of the device such as the interface operation. The control means may incorporate any form of processor or arrangement of processors which can implement the functionally of the device described above.

The device also includes a microphone 83 and microphone input 82 into the processor 81. Voice output via the processor 81 is via an amplifier 88 and loud speaker 89. A radio transceiver 84 is provided for telecommunications reception and transmission via an antenna 85. A display driver 86 is arranged to drive the display 3 and a keypad sensor 87 is arranged to receive input from the rows 4 and 5 of keys 6. The functionality as described above will be implemented by the appropriate software.

Figure 14:
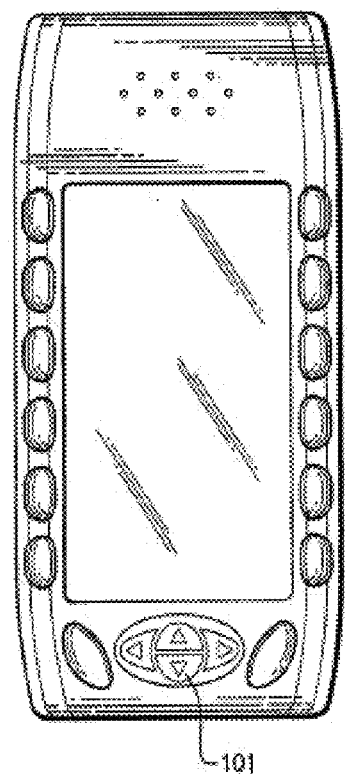
FIG. 14 is a front view of a further embodiment of a small computing device in accordance with the present invention, in the form of a mobile telephone.

FIG. 14 illustrates further embodiment of a mobile telephone in accordance with the present invention. In addition to having the same components as the mobile telephone of FIG. 1 which are indicated by the same reference numerals, the telephone of the embodiment of FIG. 14 also includes "direction" key 101. The direction key may be used for such things as scrolling or controlling games.

The above described embodiment is a small device which has a communication function and is preferably a mobile telephone. The present invention is applicable to devices which do not necessarily have communications functions. For example, the present invention may be implemented as a PDA type device which does not include a communications function but which includes computing functions such as diary, calendar, etc.

Conveniently, the present invention may be implemented as a hybrid device which includes communication function which may also include functionally which is not normally seen in a conventional mobile telephone, such as functionally associated with a PDA, e-mail, calendar, calculator, address book, world time, alarm clock and others.

Modifications and variations as would be apparent to a skilled addressee are deemed to be within the scope of the present invention.

The invention claimed is:

1. A method of entering text, the method comprising:
generating an initial display including one or more parts of a word for selection;
enabling selection of the one or more parts;
generating, in response to, and based at least in part on, the selection of the one or more parts, a display of further parts of the word for selection, wherein each of the further parts of the word for selection are associated with a corresponding key based at least on the location where each of the further parts of the word is displayed proximate to the corresponding key, wherein at least one of the further parts of the word is larger than a single character but smaller than the remaining portion of the whole word, thereby providing a suggestion which continues the word without completing the word; and
enabling selection of the further parts of the word that is larger than a single character but smaller than the remaining portion of the whole word in order to add to the selected one or more parts to build a larger part of the word in a single selection step of the corresponding key;
wherein said method is performed in a computing device and the computing device is a device with a limited interface.

2. The method according to claim 1, further comprising iterating the selection steps until the word is completed.

3. The method according to claim 1, wherein generating the initial display is based on a frequency of usage.

4. The method according to claim 1, wherein generating the initial display includes entering the one or more parts of the word to be displayed and based on the one or more parts of the word entered generating the display of the further parts of the word for selection based on a structure of a word tree.

5. The method according to claim 1, wherein the computing device is a mobile telephone.

6. The method according to claim 1, wherein the computing device is a personal digital assistant (PDA).

7. The method according to claim 1, wherein the corresponding keys are soft keys on a touch screen.

8. The method according to claim 1, wherein the corresponding keys are programmable keys.

9. The method according to claim 1, wherein if a list of expected parts of words does not contain a desired entry a user is given an option to list more parts of words and is presented with a new list which indicates a next most likely set of expected parts of words.

10. The method according to claim 1, wherein the method steps are repeated until an entire sentence is completed.

11. A non-transitory memory associated with a computing device comprising a display with a limited interface and a processor and storing software therein, the software being configured to perform a method comprising:
generating an initial display including one or more parts of a word for selection;
enabling selection of the one or more parts;
generating, in response to, and based at least in part on, the selection of the one or more parts, a display of a further parts of the word for selection, wherein each of the further parts of the word for selection are associated with a corresponding key based at least on the location where each of the further parts of the word is displayed proximate to the corresponding key, wherein at least one of the further parts of the word is larger than a single character but smaller than the remaining portion of the whole word, thereby providing a suggestion which continues the word without completing the word; and enabling selection of the further parts of the word that is larger than a single character but smaller than the remaining portion of the whole word in order to add to the selected one or more parts to build a larger part or whole of the word in a single selection step of the corresponding key.

12. The memory according to claim 11, wherein the method further comprises iterating the selection steps until the word is completed.

13. The memory according to claim 11, wherein generating the initial display is based on a frequency of usage.

14. The memory according to claim 11, wherein generating the initial display includes entering the one or more parts of the word to be displayed and based on the one or more parts of the word entered generating the display of the further parts of the word for selection based on a structure of a word tree.

15. The memory according to claim 11, wherein the device is a mobile telephone.

16. The memory according to claim 11, wherein the device is a personal digital assistant (PDA).

17. The memory according to claim 11, wherein the corresponding keys are soft keys on a touch screen.

18. The memory according to claim 11, wherein the corresponding keys are programmable keys.

19. The memory according to claim 11, wherein if a list of expected parts of words does not contain a desired entry a user is given an option to list more parts of words and is presented with a new list which indicates a next most likely set of expected parts of words.

20. The memory according to claim 11, wherein the method steps are repeated until an entire sentence is completed.

\* \* \* \* \*